United States Patent
Wang et al.

(10) Patent No.: US 12,146,819 B1
(45) Date of Patent: Nov. 19, 2024

(54) SYSTEM AND METHOD FOR DETERMINING CRITICAL SUSPENSION SPEED OF IMPELLER IN SOLID-LIQUID STIRRED TANK

(71) Applicant: QINGDAO UNIVERSITY OF SCIENCE & TECHNOLOGY, Qingdao (CN)

(72) Inventors: Datong Wang, Qingdao (CN); Ting Xu, Qingdao (CN); Hao Wang, Qingdao (CN); Fujun Lu, Qingdao (CN); Peng Guo, Qingdao (CN); Changhai Zhou, Qingdao (CN); Xu Yang, Qingdao (CN); Tao Yue, Qingdao (CN)

(73) Assignee: QINGDAO UNIVERSITY OF SCIENCE & TECHNOLOGY, Qingdao (CN)

( * ) Notice: Subject to any disclaimer, the term of this patent is extended or adjusted under 35 U.S.C. 154(b) by 0 days.

(21) Appl. No.: 18/681,851

(22) PCT Filed: Sep. 7, 2022

(86) PCT No.: PCT/CN2022/117531
§ 371 (c)(1),
(2) Date: Feb. 6, 2024

(87) PCT Pub. No.: WO2023/098204
PCT Pub. Date: Jun. 8, 2023

(30) Foreign Application Priority Data

Dec. 4, 2021 (CN) .......................... 202111468033.5

(51) Int. Cl.
*G01N 15/04* (2006.01)
(52) U.S. Cl.
CPC .................................. *G01N 15/04* (2013.01)

(58) Field of Classification Search
CPC .............. G01N 15/04; G01N 33/48735; B01F 2101/00; B01F 2101/28
See application file for complete search history.

(56) References Cited

U.S. PATENT DOCUMENTS

| 9,602,042 B2* | 3/2017 | Tada ........................ C21C 1/06 |
| 2017/0250642 A1* | 8/2017 | Fan ........................... H02P 6/06 |

(Continued)

FOREIGN PATENT DOCUMENTS

| CN | 85100356 A | 8/1986 |
| CN | 102049208 A | 5/2011 |

(Continued)

OTHER PUBLICATIONS

Huang Bolin, Solid suspension characteristics of coaxial mixers in solid-liquid stirred tanks, China National Knowledge Infrastructure, 2017, pp. 1-67.

(Continued)

*Primary Examiner* — John Fitzgerald
(74) *Attorney, Agent, or Firm* — Bayramoglu Law Offices LLC

(57) ABSTRACT

A system and method for determining a critical suspension speed of an impeller in a solid-liquid stirred tank belongs to the technical field of critical speed determination. A relationship is established between a voltage of a measurement electrode and a solid-liquid suspension state to avoid the problems of strong subjectivity and large deviation appearing in existing critical suspension speed determination based on empirical formulas and human eye observation. An electrode voltage ratio is taken as a determination criterion, which is only related to a spatial density of solid particles in a liquid phase.

3 Claims, 2 Drawing Sheets

(56) References Cited

U.S. PATENT DOCUMENTS

2020/0156030 A1* 5/2020 Lee .................. B01F 33/86
2022/0136990 A1* 5/2022 Verschinin .......... G01N 27/028
              702/19

FOREIGN PATENT DOCUMENTS

| CN | 102109455 A   | 6/2011  |         |            |
|----|---------------|---------|---------|------------|
| CN | 105675902 A   | 6/2016  |         |            |
| CN | 106512893 A * | 3/2017  | .......  | B01J 19/0006 |
| CN | 106706951 A   | 5/2017  |         |            |
| CN | 114236169 A   | 3/2022  |         |            |
| EP | 3078413 A1    | 10/2016 |         |            |
| JP | 2017138123 A  | 8/2017  |         |            |
| JP | 2019211354 A  | 12/2019 |         |            |
| WO | 2023098204 A1 | 6/2023  |         |            |

OTHER PUBLICATIONS

Zhou Geli, Principles and Methods of Biomedical Engineering Testing, Medical laboratory technology and clinical application(vol. II), 2017, pp. 576-577.

* cited by examiner

SYSTEM AND METHOD FOR DETERMINING CRITICAL SUSPENSION SPEED OF IMPELLER IN SOLID-LIQUID STIRRED TANK

CROSS REFERENCE TO THE RELATED APPLICATIONS

This application is the national phase entry of International Application No. PCT/CN2022/117531, filed on Sep. 7, 2022, which is based upon and claims priority to Chinese Patent Application No. 202111468033.5, filed on Dec. 4, 2021, the entire contents of which are incorporated herein by reference.

TECHNICAL FIELD

The present disclosure relates to the technical field of critical speed determination, and in particular to a system and method for determining a critical suspension speed of an impeller in a solid-liquid stirred tank.

BACKGROUND

Critical suspension refers to a just-suspended state of solid particles in a stirred tank, and critical suspension speed refers to the speed of the impeller in the stirred tank when critical suspension occurs. The determination of the critical suspension speed is of great significance for solid-liquid stirring. When the speed of the impeller does not reach the critical suspension speed, the solid particles deposit and there are many dead zones in the stirred tank, affecting the mass transfer effect. When the speed of the impeller exceeds the critical suspension speed, further increasing the speed of the impeller will lead to a great increase in the power consumption and a decrease in the durability of the impeller, without proportionally improving the mass transfer effect on the solid surface. Setting the speed of the impeller to the critical suspension speed can achieve the most economical effect, so the determination of the critical suspension speed is of great practical significance.

In experiments, the critical suspension speed is usually determined by a Zwietering criterion. That is, the just-suspended state occurs when the solid particles deposit at the bottom of the stirred tank for not more than 1-2s. This determination method requires a transparent stirred tank, and the results have strong subjectivity. Moreover, suspension systems with high particle concentrations often exhibit an opaque state, which affects the determination of the suspension state. In industrial production, most stirred tanks are opaque, and the solid-liquid state inside cannot be directly observed. The determination of the critical suspension speed based on empirical formulas is generally constrained by various factors such as blade shape, size, height off the bottom of the stirred tank, and particle diameter distribution, which often leads to significant deviations from the actual situation. Therefore, developing a quantifiable and widely applicable critical suspension speed determination method has important practical significance.

SUMMARY

In view of the above-mentioned problems, an objective of the present disclosure is to provide a system and method for determining a critical suspension speed of an impeller in a solid-liquid stirred tank.

In order to achieve the above objective, the present disclosure is implemented by the following technical solutions:

A system for determining a critical suspension speed of an impeller in a solid-liquid stirred tank includes a stirred tank, where an impeller is provided in the stirred tank; the impeller is connected to a motor; the motor is connected to a speed controller; a side wall of the stirred tank horizontally flush with the impeller is provided with a first set of electrodes; a middle bottom position of the stirred tank is provided with a second set of electrodes; the first set of electrodes includes two first excitation electrodes and two first measurement electrodes; the second set of electrodes includes two second excitation electrodes and two second measurement electrodes; the first excitation electrodes and the second excitation electrodes are connected to a constant-current source; and the first measurement electrodes and the second measurement electrodes are connected to a computer through an analog-to-digital converter.

Preferably, the constant-current source is an alternating current (AC) constant-current source.

Preferably, the first excitation electrodes are equidistant between the first measurement electrodes; and the second excitation electrodes are equidistant between the second measurement electrodes.

The present disclosure further includes a method for determining a critical suspension speed of an impeller, based on the system for determining a critical suspension speed of an impeller in a solid-liquid stirred tank, and including the following steps:

(1) mounting the first set of electrodes at the side wall of the stirred tank horizontally flush with the impeller and the second set of electrodes at the middle bottom position of the stirred tank; controlling, by the motor and the speed controller, a speed of the impeller, wherein the first set of electrodes includes the two first excitation electrodes and the two first measurement electrodes, and the second set of electrodes includes the two second excitation electrodes and the two second measurement electrodes; supplying, by the constant-current source, an excitation current to the first excitation electrodes and the second excitation electrodes, respectively; and synchronously recording, by the computer, voltages of the first measurement electrodes and the second measurement electrodes through the analog-to-digital converter, respectively;

(2) starting the speed controller to gradually adjust the speed of the impeller in an ascending order; and recording, after voltage signals of the two sets of measurement electrodes are stabilized, the values of the voltages and the speed of the impeller; and (3) plotting a curve with a voltage ratio of the second measurement electrodes to the first measurement electrodes as an ordinate and the corresponding speed as an abscissa; and determining a speed corresponding to an inflection point of the curve as a critical suspension speed of the impeller.

Compared with the prior art, the present disclosure has the following advantages:

The present disclosure establishes a relationship between the voltage of the measurement electrode and the solid-liquid suspension state, avoiding strong subjectivity and large deviation appearing in existing critical suspension speed determination based on empirical formulas and human eye observation. The present disclosure has good adaptability and provides a quantifiable method for determining the critical suspension speed. The present disclosure takes the electrode voltage ratio as a determination criterion, which is only related to the spatial density of solid particles in the liquid phase, making the determination method applicable to a wide range of viscosity and solid content in the solid-liquid phase system.

DETAILED DESCRIPTION OF THE EMBODIMENTS

An objective of the present disclosure is to provide a system and method for determining a critical suspension speed of an impeller in a solid-liquid stirred tank. The present disclosure is implemented through the following technical solutions.

The present disclosure is described in further detail below according to specific embodiments.

Embodiment 1

Figure 1:
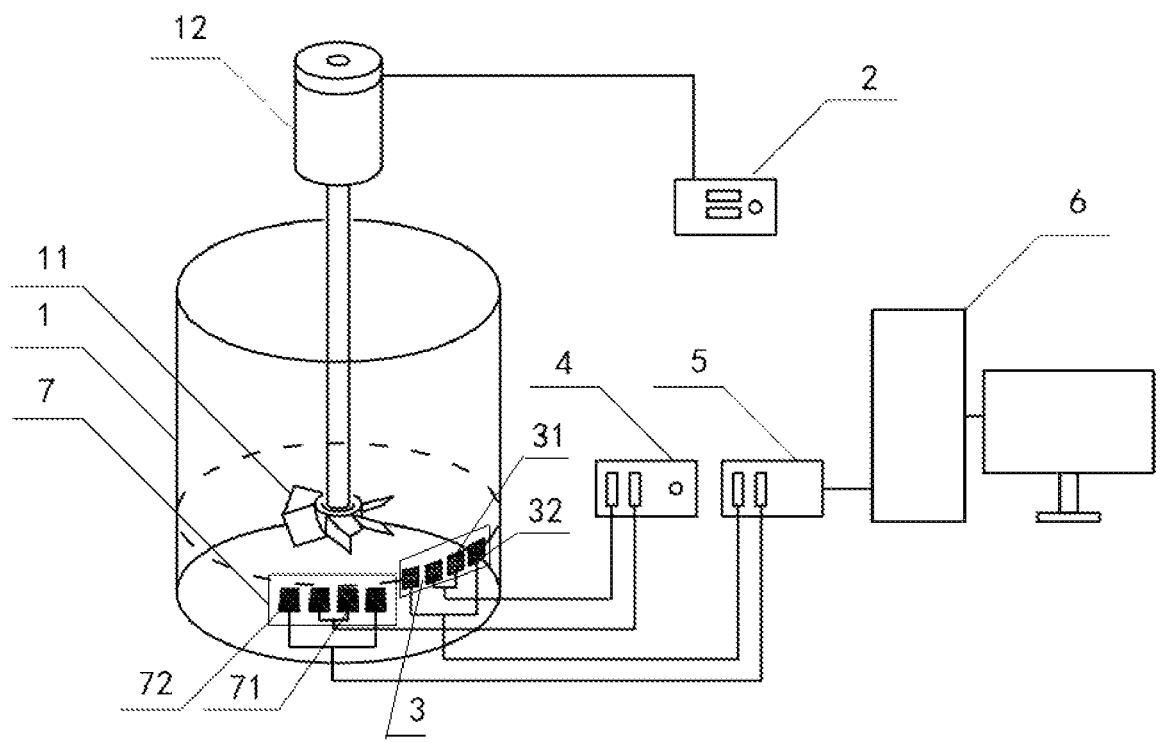
FIG. 1 is a structural diagram of a system for determining a critical suspension speed of an impeller in a solid-liquid stirred tank according to the present disclosure.

The present disclosure provides a system for determining a critical suspension speed of an impeller in a solid-liquid stirred tank. As shown in FIG. 1, the system includes stirred tank 1. Impeller 11 is provided in the stirred tank 1. The impeller 11 is connected to motor 12. The motor 12 is connected to speed controller 2. A side wall of the stirred tank 1 horizontally flush with the impeller 11 is provided with a first set of electrodes 3. A middle bottom position of the stirred tank 1 is provided with a second set of electrodes 7. The first set of electrodes 3 includes two first excitation electrodes 31 and two first measurement electrodes 32. The second set of electrodes 7 includes two second excitation electrodes 71 and two second measurement electrodes 72. The first excitation electrodes 31 and the second excitation electrodes 71 are connected to constant-current source 4. The first measurement electrodes 32 and the second measurement electrodes 72 are connected to computer 6 through analog-to-digital converter 5.

The constant-current source 4 can be an alternating current (AC) constant-current source.

The first excitation electrodes 31 are equidistant between the first measurement electrodes 32. The second excitation electrodes 71 are equidistant between the second measurement electrodes 72.

Embodiment 2

The present disclosure further provides a method for determining a critical suspension speed of an impeller, based on the system for determining a critical suspension speed of an impeller in a solid-liquid stirred tank in Embodiment 1, and including the following steps.

(1) As shown in FIG. 1, the side wall of the stirred tank 1 horizontally flush with the impeller 11 is provided with the first set of electrodes 3, and the middle bottom position of the stirred tank 1 is provided with the second set of electrodes 7. A speed of the impeller 11 is adjusted through the motor and the speed controller. The first set of electrodes 3 includes two first excitation electrodes 31 and two first measurement electrodes 32. The second set of electrodes 7 includes two second excitation electrodes 71 and two second measurement electrodes 72. The stirred tank has a height of 0.6 m, a diameter of 0.4 m, and a liquid level of 0.4 m. Tap water is used as a liquid-phase medium, which has a conductivity of 360 μS/cm, a density of 998 kg/m$^3$, a dynamic viscosity of $1 \times 10^3$ Pa·s. Glass microspheres are used as solid particles, which have a diameter of 250-500 μm, a density of 2,500 kg/m$^3$, and a solid content of 10%. The impeller includes 6 axial-flow inclined blades, with a height of 0.15 m off a bottom of the stirred tank. The four electrodes in each set are evenly arranged with a spacing of 1 cm.

The constant-current source supplies a 5 mA excitation current to the first excitation electrodes 31 and the second excitation electrodes 71, respectively. The first measurement electrodes 32 and the second measurement electrodes 72 are connected to the computer 6 through the analog-to-digital converter 5 to synchronously record respective voltages.

(2) The speed controller 2 is started to gradually adjust the speed of the impeller in an ascending order, with each adjustment increment being 30 r/min. After voltage signals of the two sets of measurement electrodes are stabilized, the voltage of the first measurement electrodes 32, the voltage of the second measurement electrodes 72, and the speed of the impeller are recorded.

(3) A curve is plotted with a voltage ratio of the second measurement electrodes to the first measurement electrodes as an ordinate and the corresponding speed as an abscissa. The speed corresponding to an inflection point of the curve is the critical suspension speed of the impeller.

Figure 2:
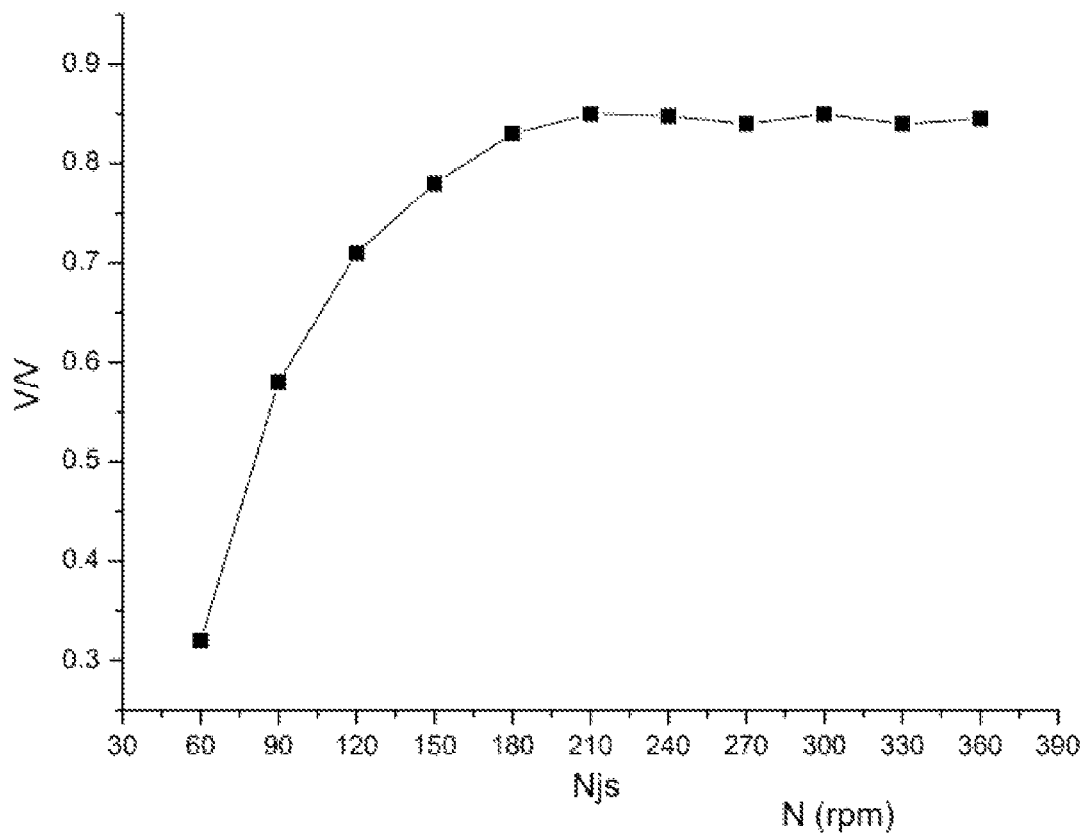
FIG. 2 is a schematic diagram of a curve of a method for determining a critical suspension speed of an impeller according to Embodiment 2 of the present disclosure, where the curved is plotted with a voltage ratio of a second measurement electrode to a first measurement electrode as an ordinate and a corresponding speed as an abscissa.

The ratio of the voltage signals corresponds to a concentration change of solid particles in a measurement space. A point on the curve with a slope of zero or negative corresponds to a critical suspension state when the solid phase between the measurement electrodes are just suspended from the surface of the measurement electrode at the bottom. At this point, increasing the speed will cause no obvious change in the concentration of the solid particles in the measurement space. Therefore, the speed corresponding to this point is the critical suspension speed of the impeller. As shown in FIG. 2, when the speed is 210 rpm, the inflection point appears on the curve, so the critical suspension speed Njs is 210 rpm.

Embodiment 3

The present disclosure further provides a method for determining a critical suspension speed of an impeller, based on the system for determining a critical suspension speed of an impeller in a solid-liquid stirred tank in Embodiment 1, and including the following steps.

(1) As shown in FIG. 1, the side wall of the stirred tank 1 horizontally flush with the impeller 11 is provided with the first set of electrodes 3, and the middle bottom position of the stirred tank 1 is provided with the second set of electrodes 7. A speed of the impeller 11 is adjusted through the motor and the speed controller. The first set of electrodes 3 includes two first excitation electrodes 31 and two first measurement electrodes 32. The second set of electrodes 7 includes two second excitation electrodes 71 and two second measurement electrodes 72.

The stirred tank has a height of 0.6 m, a diameter of 0.4 m, and a liquid level of 0.4 m. Tap water doped with 2% sodium carboxymethyl cellulose is used as a liquid-phase medium, which has a dynamic viscosity of 4,000 mPa·s. Glass microspheres are used as solid particles, which have a diameter of 250-500 μm, a density of 2,500 kg/m$^3$, and a solid content of 0.5%. The impeller includes 6 axial-flow inclined blades, with a height of 0.15 m off a bottom of the stirred tank. The four electrodes in each set are evenly arranged with a spacing of 1 cm. The constant-current source 4 supplies a 5 mA excitation current to the first excitation electrodes 31 and the second excitation electrodes 71, respectively. The glass microspheres are added into the stirred tank 1. The speed controller 2 is started to gradually adjust the speed of the impeller in an ascending order, with each adjustment increment being 30 r/min. The voltage of the first measurement electrodes 32, the voltage of the second measurement electrodes 72, and the speed of the impeller are recorded through the analog-to-digital converter 5 and the computer 6.

(3) A curve is plotted with a voltage ratio of the second measurement electrodes to the first measurement electrodes as an ordinate and the corresponding speed as an abscissa. The speed corresponding to an inflection point of the curve is the critical suspension speed of the impeller.

Figure 3:
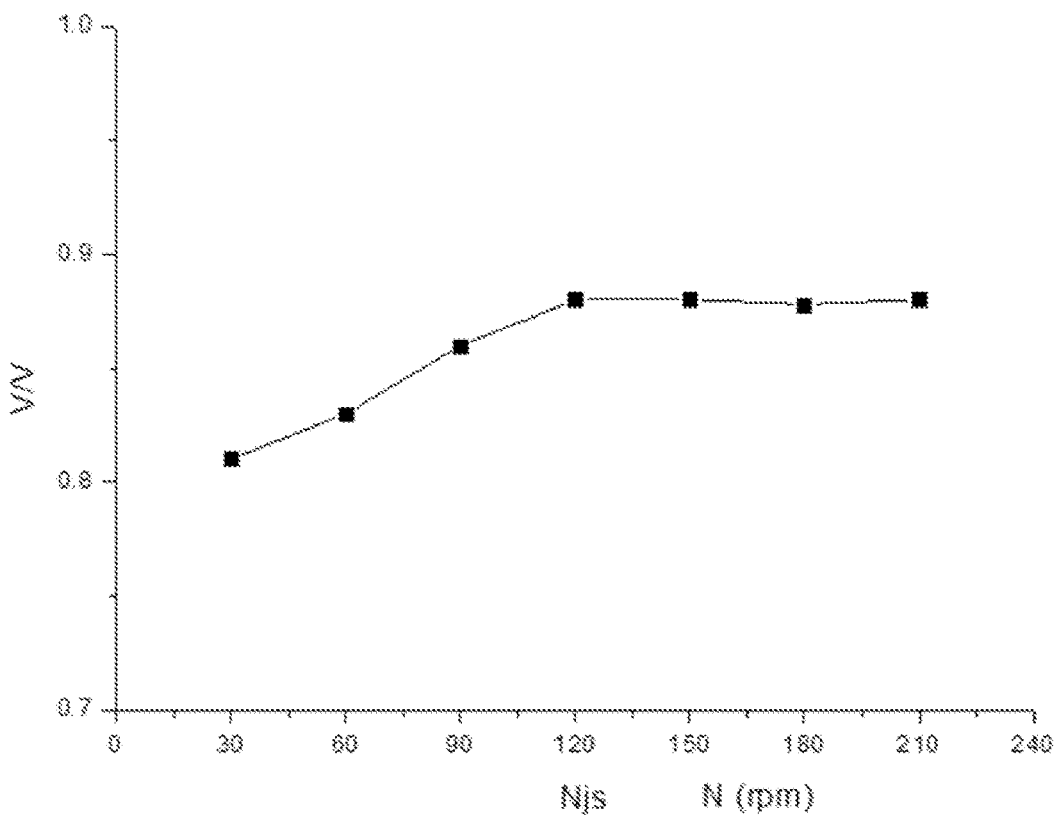
FIG. 3 is a schematic diagram of a curve of a method for determining a critical suspension speed of an impeller according to Embodiment 3 of the present disclosure, where the curved is plotted with a voltage ratio of a second measurement electrode to a first measurement electrode as an ordinate and a corresponding speed as an abscissa.

The ratio of the voltage signals corresponds to a concentration change of solid particles in a measurement space. A point on the curve with a slope of zero or negative corresponds to a critical suspension state when the solid phase between the measurement electrodes are just suspended from the surface of the measurement electrode at the bottom. At this point, increasing the speed will cause no obvious change in the concentration of the solid particles in the measurement space. Therefore, the speed corresponding to this point is the critical suspension speed of the impeller. As shown in FIG. 3, when the speed is 120 rpm, the inflection point appears on the curve, so the critical suspension speed Njs is 120 rpm.

Embodiment 4

The present disclosure further provides a method for determining a critical suspension speed of an impeller, based on the system for determining a critical suspension speed of an impeller in a solid-liquid stirred tank in Embodiment 1, and including the following steps.

(1) As shown in FIG. 1, the side wall of the stirred tank 1 horizontally flush with the impeller 11 is provided with the first set of electrodes 3, and the middle bottom position of the stirred tank 1 is provided with the second set of electrodes 7. A speed of the impeller 11 is adjusted through the motor and the speed controller. The first set of electrodes 3 includes two first excitation electrodes 31 and two first measurement electrodes 32. The second set of electrodes 7 includes two second excitation electrodes 71 and two second measurement electrodes 72.

The stirred tank has a height of 0.6 m, a diameter of 0.4 m, and a liquid level of 0.4 m. Tap water doped with 2% hydroxyethyl cellulose is used as a liquid-phase medium, which has a dynamic viscosity of 2,200 mPa·s. Glass microspheres are used as solid particles, which have a diameter of 250-500 μm, a density of 2,500 kg/m$^3$, and a solid content of 30%. The impeller includes 6 axial-flow inclined blades, with a height of 0.15 m off a bottom of the stirred tank. The four electrodes in each set are evenly arranged with a spacing of 1 cm. The constant-current source 4 supplies a 5 mA excitation current to the first excitation electrodes 31 and the second excitation electrodes 71, respectively. The glass microspheres are added into the stirred tank 1. The speed controller 2 is started to gradually adjust the speed of the impeller in an ascending order, with each adjustment increment being 30 r/min. The voltage of the first measurement electrodes 32, the voltage of the second measurement electrodes 72, and the speed of the impeller are recorded through the analog-to-digital converter 5 and the computer 6.

(3) A curve is plotted with a voltage ratio of the second measurement electrodes to the first measurement electrodes as an ordinate and the corresponding speed as an abscissa. The speed corresponding to an inflection point of the curve is the critical suspension speed of the impeller.

Figure 4:
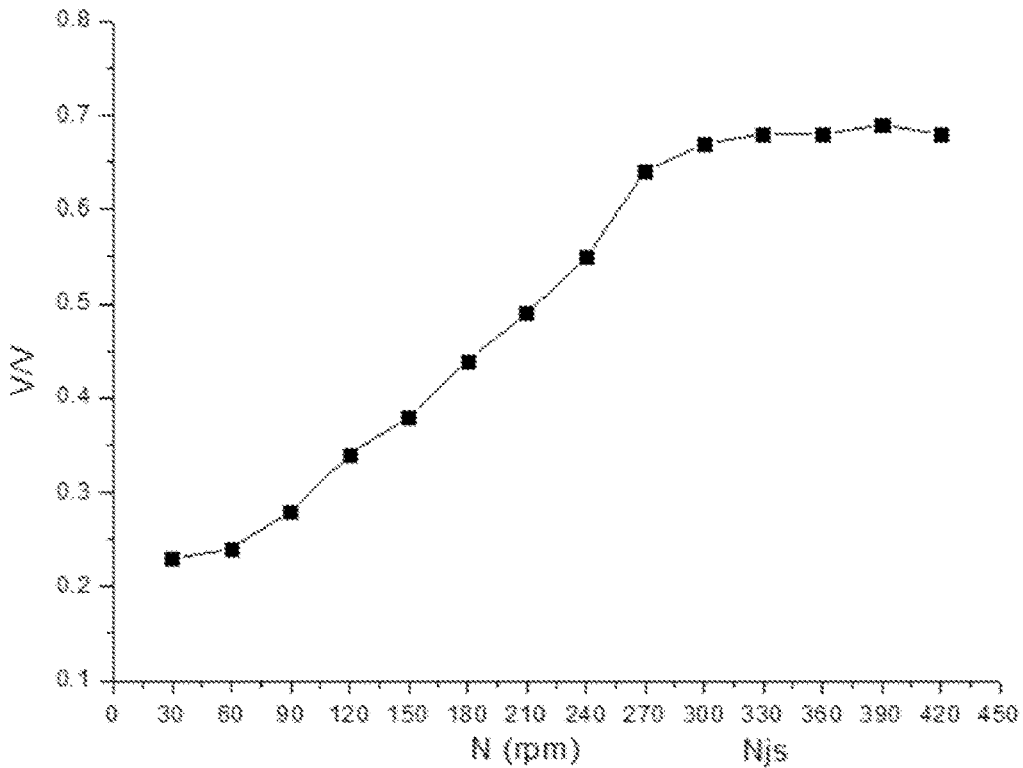
FIG. 4 is a schematic diagram of a curve of a method for determining a critical suspension speed of an impeller according to Embodiment 4 of the present disclosure, where the curved is plotted with a voltage ratio of a second measurement electrode to a first measurement electrode as an ordinate and a corresponding speed as an abscissa.

The ratio of the voltage signals corresponds to a concentration change of solid particles in a measurement space. A point on the curve with a slope of zero or negative corresponds to a critical suspension state when the solid phase between the measurement electrodes are just suspended from the surface of the measurement electrode at the bottom. At this point, increasing the speed will cause no obvious change in the concentration of the solid particles in the measurement space. Therefore, the speed corresponding to this point is the critical suspension speed of the impeller. As shown in FIG. 4, when the speed is 330 rpm, the inflection point appears on the curve, so the critical suspension speed Njs is 330 rpm.

In Embodiments 2 to 4, the adjustment increment for the speed of the impeller can also be 20-40 r/min, which does not affect the final determination of the critical suspension speed Njs.

What is claimed is:

1. A system for determining a critical suspension speed of an impeller in a solid-liquid stirred tank, comprising a stirred tank, wherein an impeller is provided in the stirred tank; the impeller is connected to a motor; the motor is connected to a speed controller; a side wall of the stirred tank horizontally flush with the impeller is provided with a first set of electrodes; a middle bottom position of the stirred tank is provided with a second set of electrodes; the first set of electrodes comprises two first excitation electrodes and two first measurement electrodes; the second set of electrodes comprises two second excitation electrodes and two second measurement electrodes; the first excitation electrodes and the second excitation electrodes are connected to a constant-current source; and the first measurement electrodes and the second measurement electrodes are connected to a computer through an analog-to-digital converter;

wherein the first excitation electrodes are equidistant between the first measurement electrodes, and the second excitation electrodes are equidistant between the second measurement electrodes.

2. The system for determining the critical suspension speed of the impeller in the solid-liquid stirred tank according to claim 1, wherein the constant-current source is an alternating current (AC) constant-current source.

3. A method for determining a critical suspension speed of an impeller, based on the system for determining the critical suspension speed of the impeller in the solid-liquid stirred tank according to claim 1, and comprising the following steps:
(1) mounting the first set of electrodes at the side wall of the stirred tank horizontally flush with the impeller and the second set of electrodes at the middle bottom position of the stirred tank; controlling, by the motor and the speed controller, a speed of the impeller, wherein the first set of electrodes comprises the two first excitation electrodes and the two first measurement electrodes, and the second set of electrodes comprises the two second excitation electrodes and the two second measurement electrodes; supplying, by the constant-current source, an excitation current to the first excitation electrodes and the second excitation electrodes, respectively; and synchronously recording, by the computer, voltages of the first measurement electrodes and the second measurement electrodes through the analog-to-digital converter, respectively;
(2) starting the speed controller to gradually adjust the speed of the impeller in an ascending order; and recording, after voltage signals of the two sets of measurement electrodes are stabilized, values of the voltages and the speed of the impeller; and
(3) plotting a curve with a voltage ratio of the second measurement electrodes to the first measurement electrodes as an ordinate and the corresponding speed as an abscissa; and determining a speed corresponding to an inflection point of the curve as the critical suspension speed of the impeller.

* * * * *